(12) United States Patent
Scholich-Tessmann et al.

(10) Patent No.: US 8,304,691 B2
(45) Date of Patent: Nov. 6, 2012

(54) DETERMINING A FOCAL POSITION OF A LASER

(75) Inventors: Wolfgang Scholich-Tessmann, Böblingen (DE); Andreas Milich, Hemmingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 1279 days.

(21) Appl. No.: 11/963,570

(22) Filed: Dec. 21, 2007

(65) Prior Publication Data
US 2008/0180657 A1    Jul. 31, 2008

Related U.S. Application Data

(63) Continuation-in-part of application No. PCT/EP2005/006805, filed on Jun. 23, 2005.

(51) Int. Cl.
B23K 26/04 (2006.01)

(52) U.S. Cl. .................................. 219/121.83

(58) Field of Classification Search ............... 250/201.2; 356/123; 219/121.83, 121.73
See application file for complete search history.

(56) References Cited

U.S. PATENT DOCUMENTS

| | | | |
|---|---|---|---|
| 4,472,055 A | | 9/1984 | Tsutsumi |
| 5,373,135 A | | 12/1994 | Beyer et al. |
| 5,486,677 A | | 1/1996 | Maischner et al. |
| 5,670,773 A | * | 9/1997 | Planeix .................... 250/201.2 |
| 6,151,109 A | * | 11/2000 | Bromssen et al. ....... 219/121.83 |
| 6,355,908 B1 | * | 3/2002 | Tatah et al. ............. 219/121.83 |
| 6,501,061 B1 | * | 12/2002 | Kitai et al. ................ 250/201.1 |
| 6,621,060 B1 | * | 9/2003 | Nantel et al. ............. 250/201.4 |
| 6,646,728 B1 | * | 11/2003 | Tang et al. ...................... 356/123 |
| 6,791,057 B1 | | 9/2004 | Kratzsch et al. |
| 2003/0227614 A1 | * | 12/2003 | Taminiau et al. ............ 356/125 |
| 2004/0070761 A1 | * | 4/2004 | Horvath et al. ............... 356/399 |

FOREIGN PATENT DOCUMENTS

| | | |
|---|---|---|
| DE | 8914687.5 | 5/1990 |
| DE | 4025577 A1 * | 2/1992 |
| DE | 19520213 | 12/1995 |
| DE | 19857694 | 6/2000 |
| DE | 10131610 | 2/2003 |
| DE | 10160623 | 6/2003 |
| DE | 10229498 | 1/2004 |
| DE | 10244548 A * | 4/2004 |
| DE | 10244548 A1 * | 4/2004 |
| DE | 10248458 A * | 5/2004 |
| DE | 10329744 | 9/2004 |

(Continued)

OTHER PUBLICATIONS

Machine translation of Japan Patent document No. 2000-216,457, Jul. 2011.*

(Continued)

Primary Examiner — Geoffrey S Evans
(74) Attorney, Agent, or Firm — Fish & Richardson P.C.

(57) ABSTRACT

A method is performed for determining a suitable workpiece processing focal position of a laser beam. The method includes adjusting one or more of a laser beam and a workpiece until a periphery of the laser beam contacts a lateral edge of the workpiece, determining, from at least a focal position of the laser beam associated with the peripheral beam contact with the workpiece, a suitable workpiece processing focal position of the laser beam, and then adjusting the laser beam to the suitable workpiece processing focal position.

29 Claims, 5 Drawing Sheets

FOREIGN PATENT DOCUMENTS

| | | | |
|---|---|---|---|
| EP | 0 554 523 | | 4/1997 |
| EP | 1 078 710 | | 6/2004 |
| JP | 59-78792 A | * | 5/1984 |
| JP | 60-227995 A | | 11/1985 |
| JP | 63-180392 A | * | 7/1988 |
| JP | 2-220794 A | * | 9/1990 |
| JP | 6-254691 | | 9/1994 |
| JP | 7-16779 A | * | 1/1995 |
| JP | 7-60468 A | * | 3/1995 |
| JP | 7-112288 A | * | 5/1995 |
| JP | 7-232290 A | | 9/1995 |
| JP | 2000-176668 A | * | 6/2000 |
| JP | 2000-216457 A | * | 8/2000 |
| JP | 2000312985 | | 11/2000 |
| JP | 2001-150171 | * | 6/2001 |
| JP | 2001-340979 A | * | 12/2001 |
| JP | 2002-239768 A | * | 8/2002 |
| JP | 2002307176 | | 10/2002 |
| WO | WO 98/50196 | | 11/1998 |
| WO | WO 2004/050290 | | 6/2004 |

OTHER PUBLICATIONS

Machine translation of Japan Patent document No. 2001-340,979, Jul. 2011.*
Machine translation of Japan Patent document No. 2002-239,768, Jul. 2011.*
Machine translation of German Patent document No. DE-10248458, Jul. 2011.*
Machine translation of Germany Patent document No. DE-4025577, Jan. 2012.*
Machine translation of Germany Patent Document No. DE-10244548, Jan. 2012.*
Machine translation of Japan Patent No. 2001-150,171, Jan. 2012.*
International Preliminary Report on Patentability and Written Opinion issued by the International Bureau from the corresponding PCT Application No. PCT/EP2005/006805, issued Mar. 10, 2006, 10 pages and the English translation of the Written Opinion issued by the International Bureau, mailed Jan. 24, 2008, 4 pages.

* cited by examiner

DETERMINING A FOCAL POSITION OF A LASER

CROSS REFERENCE TO RELATED APPLICATION

This application is a continuation-in-part of, and claims priority under 35 U.S.C. §120 to PCT/EP2005/006805, filed on Jun. 23, 2005, and designating the U.S., which is hereby incorporated by reference in its entirety.

TECHNICAL FIELD

The invention relates to a method for determining the local position of a laser beam of a laser installation, such as a laser cutting installation.

BACKGROUND

In order to be able to process workpieces to a sufficiently precise degree, whether by means of laser cutting or laser welding, the laser beam is brought into contact with the workpiece at the location where the laser beam has the highest power density. Therefore, the narrowest location of the laser beam should be determined. To that end, for example, it is known to cut different slots in a reference workpiece with the laser beam, with a different focal position being used for each slot. Subsequently, the reference workpiece is removed and the slot width is manually measured. The focal position with which the smallest slot width has been achieved is the focal position that is most suitable for processing workpieces.

DE 198 57 694 A1 discloses the adjustment of the focal point of a laser beam that is directed towards a workpiece and that is discharged from a processing head with a focusing device for the laser beam. First, a plurality of mutually separate channels are burnt into the surface of the workpiece by means of the laser beam with mutually different distances between the processing head and the workpiece and otherwise under the same conditions. The intensity of the resultant plasma for each channel is separately measured. Subsequently, that distance between the processing head and the workpiece is sought for which the maximum plasma intensity was measured. The laser processing installation is subsequently calibrated with that distance.

SUMMARY

In one general aspect, a suitable workpiece processing focal position of a laser beam is determined as follows. One or more of a laser beam and a workpiece are adjusted until a periphery of the laser beam contacts a lateral edge of the workpiece. Then, a suitable workpiece processing focal position of the laser beam is determined from at least a focal position of the laser beam associated with the peripheral beam contact with the workpiece. Next, the laser beam is adjusted to the suitable workpiece processing focal position.

Implementations can include one or more of the following features. The suitable workpiece processing focal position can be determined using information about a laser beam axis position. The suitable workpiece processing focal position can be determined using information about a beam diameter of the laser beam. The suitable workpiece processing focal position can be determined using information about laser light reflected from the workpiece. The suitable workpiece processing focal position can be determined using information about process light at the workpiece. The suitable workpiece processing focal position can be determined using information about an intensity of radiation reflected from the workpiece.

The workpiece can be processed with the laser beam adjusted to the suitable workpiece processing focal position.

One or more of the laser beam and the workpiece can be adjusted until the periphery of the laser beam breaks contact with the lateral edge of the workpiece.

The laser beam can be switched off if the periphery of the laser beam contacts the lateral edge of the workpiece.

The one or more of the laser beam and the workpiece can be adjusted by adjusting one or more of a beam axis of the laser beam, a location of the workpiece, or the focal position of the laser beam. The one or more of the laser beam and the workpiece can be adjusted by continuously adjusting the focal position of the laser beam.

A through hole can be formed in the workpiece with the laser beam, where the lateral edge of the workpiece is defined by the through hole.

The lateral edge of the workpiece can be defined by an opening in the workpiece. The lateral edge of the workpiece can be defined by an outer lateral edge of the workpiece.

The suitable workpiece processing focal position of the laser beam can be determined includes using information about a focal position of the laser beam when the laser beam is not in contact with the workpiece.

The suitable workpiece processing focal position of the laser beam can be determined using information about a focal position of the laser beam when the laser beam is in contact with a top corner of the lateral edge of the workpiece, and using information about a focal position of the laser beam when the laser beam is in contact with a lower corner of the lateral edge of the workpiece.

The laser beam can be adjusted to the suitable workpiece processing focal position by adjusting the laser beam in an iterative manner.

In another general aspect, a focal position of a laser beam of a laser installation, which focal position is suitable for a workpiece processing operation is determined. The laser beam is directed toward a workpiece, the focal position of the laser beam is adjusted, and it is ascertained for at least two different focal positions whether at least a peripheral region of the laser beam contacts a workpiece at least in part by determining a parameter associated with one or more of the laser beam and the workpiece.

Implementations can include one or more of the following features. The parameter can be determined by measuring at least one variable that describes the circumstances under which at least the peripheral region of the laser beam contacts the workpiece. The parameter can be determined by detecting radiation or process light emitted at the workpiece. The parameter can be determined by detecting plasma radiation. The parameter can be determined by determining a beam axis of the laser beam.

The suitable focal position can be determined by ascertaining the circumstances under which the peripheral region of the laser beam contacts the workpiece.

The suitable focal position can be determined by ascertaining the circumstances under which the peripheral region of the laser beam no longer contacts the workpiece after determining a focal position at which the peripheral region of the laser beam contacts the workpiece.

One or more of the workpiece and the laser beam can be moved relative to each other until the peripheral region of the laser beam contacts the workpiece.

The laser beam can be switched off if it is ascertained that the peripheral region of the laser beam is contacting the workpiece.

A through-hole in the workpiece can be produced while operating the laser beam at a first focal position, and subsequently, the laser beam while operating at a second focal position, can be directed at the through-hole.

A suitable focal position can be established in an iterative manner.

The focal position can be varied continuously or quasi-continuously.

One or more of the laser beam and the workpiece can be moved relative to each other while varying the focal position.

The parameter can be determined by determining whether the peripheral region of the laser beam comes into contact with an upper side or an underside of the workpiece.

Methods are described for determining the focal position of a laser beam of a laser installation, for example, a laser cutting installation. The focal position is suitable for workpiece processing, and at least two different focal positions are adjusted. The methods described provide a relatively simple and automated way to determine the laser focal position.

It is established for various focal positions of the laser beam whether and under what circumstances at least the peripheral region of the laser beam comes into contact with a workpiece. Therefore, it is detected when—and, in accordance with an adjustable focal position—the laser beam comes into contact with material with its peripheral region. At various focal positions, this contact occurs at different distances of the beam axis of the laser beam from an edge of the workpiece or in accordance with the magnitude of an already-produced through-hole of the workpiece. The method can be automated so that the focal position can automatically be established. Manual measurement of a reference workpiece can therefore be dispensed with.

In some implementations, there can be provision for at least one variable that describes the circumstances under which at least the peripheral region of the laser beam comes into contact with the workpiece to be measured. Variables that describe the circumstances can include, for example, the distance of the beam axis relative to the workpiece, for example, an edge of the workpiece or the intensity of radiation detected, for example, of process light.

The method can include determining whether the peripheral region of the laser beam comes into contact with the workpiece in that radiation emitted by the workpiece or a plasma is detected. In particular, light having a sensitivity maximum at a wavelength of one micrometer can be measured. It is thereby possible for the measurement to be carried out more accurately. It is conceivable, though not as accurate, to measure the plasma radiation if a plasma is produced during laser processing. The accuracy suffers in that the plasma radiation occurs relatively late when a relatively large amount of material of the workpiece has already been melted and consumed. Plasma radiation can be detected with a measuring device such as a photodiode placed near the laser and the processing head, and close to the laser.

It is further conceivable to measure non-reflected process light. In all operating methods, particular emphasis is intended to be placed on detecting as early as possible when the peripheral region of the laser beam comes into contact with the workpiece.

In an advantageous method variant, on the basis of the circumstances established, the suitable focal position or an additional focal position is established, for which it is again measured whether and under what circumstances the peripheral region of the laser beam comes into contact with the workpiece. If it is found from the circumstances established that the peripheral region of the laser beam does not come into contact with the workpiece, this may indicate that the suitable focal position has been found because, for example, the minimum distance of the beam axis relative to the workpiece has been found or the laser beam at the level of the workpiece is narrower than a through-hole which was previously produced in the workpiece. Alternatively, if the suitable focal position has not been found, it is possible to establish, from the previously established circumstances for other focal positions, the direction in which the focal position has to be adjusted for the next attempt in order to move towards the suitable focal position.

In an advantageous method variant, a workpiece is touched with the laser beam, in particular, at different focal position, in that the workpiece and laser beam are moved towards each other until the peripheral region of the laser beam commences a processing operation, in particular, a cutting operation, on the workpiece. A workpiece can be touched with the laser beam from one or more sides. Alternatively, in a workpiece, it is conceivable to touch the sides of an aperture constructed in the workpiece with the beam. In that manner, it is possible to establish the beam diameter at a given focal position. That method can be repeated until the smallest beam diameter has been found. The associated focal position is then the suitable focal point of the laser beam for processing workpieces.

It is particularly advantageous for the laser beam to be switched off as soon as it is detected that the laser beam has come into contact with the workpiece. The workpiece is thereby damaged is little as possible. The accuracy of establishing the focal position can further be increased thereby.

In another implementation, first, at a first focal position, a through-hole is produced in the workpiece and, subsequently, with at least one additional focal position, the production of the through-hole is repeated. For example, a hole or a slot can be produced in the workpiece as the through-hole. The production of a slot has the advantage that the laser installation is operational for a given time and is thereby warned up. The focal position can thereby be established when the laser installation is warmed up, which corresponds to the conditions during processing of workpieces. For example, it may be provided that a hole or a slot is first produced with any focal position in a thin metal sheet (reference) and, subsequently, the operation is repeated at the same position with a different focal position. If, in that case, process light is produced, the beam diameter is greater in comparison with the first hole or slot. If no process light is produced, the beam diameter is smaller in comparison with the first hole or slot. The process light can be measured, for example, with an opto-electronic unit. In particular, the process light can be measured with a sensor, a camera, a perforated mirror or the like. In an additional method step, the operation for producing a through-hole can be repeated with the first adjusted focal position (reference) and, for the subsequent hole or cut, a focal position having the opposite focal difference with respect to the reference hole or slot in relation to the first attempt can be selected. The direction for the focus search can be established from the two test results. This means that, if the reference hole or slot is carried out with the focal position x, the second hole or slot could be carried out in the first attempt with the focal position x+y and in the second attempt with x−y. As long as x does not correspond precisely to the desired suitable focal position, process light will be produced only in one of the two attempts at the second hole or slot in each case. Owing to this information, the direction in which the focused beam becomes greater or smaller on the surface of the sheet metal is known and it is possible to move iteratively towards the suitable focal position. By means of a measuring unit which has already been mentioned above and which is in particular an opto-electronic measuring unit for the process light, this operation can be automated.

It is further possible to establish the focal position in that the focal position is varied continuously or quasi-continuously. For example, it is conceivable for the beam axis to have a fixed distance from a workpiece edge. If the focal position is subsequently varied, that is to say, changed continuously or quasi-continuously between two extreme values, and if the beam axis is arranged so as to be close enough to the workpiece edge, process light will be produced for a small number of focal positions, whereas for other focal positions no process light will be produced. If process light is produced, this means that the laser beam has a relatively large diameter at the level of the workpiece. Therefore, that focal position is not suitable for a laser processing operation. The object is to search for those focal positions with which no process light is produced. Therefore, the focal position acts as a variable which describes the circumstances under which a peripheral region of the laser beam comes into contact with the workpiece.

The above-mentioned method variant is relatively imprecise if the laser beam is not moved along the workpiece. Therefore, it is advantageous, in order to increase the accuracy, for the laser beam and the workpiece to be moved relative to each other whilst the focal position is varied. It is recorded at which relative positions of the laser beam and the workpiece the laser beam and the workpiece come into contact, and in particular process light is produced. In particular, the laser beam can be moved along a side of the workpiece. The focal position which is suitable for a laser processing operation can be found particularly quickly with continuous variation of the focal position. If the laser beam is moved along the workpiece, the focal position can be established when the laser installation is warmed up.

It is further possible to find the suitable focal position in that an incision is produced in a workpiece, with the focal position being varied whilst the incision is being produced, and in that the operation is subsequently repeated at the same location, the focal position being varied with an offset during the second incision.

It is particularly preferable if it is measured under what circumstances, in particular with which focal positions, the peripheral region of the laser beam comes into contact with the upper side or the underside of the workpiece. If those two focal positions are established, a focal position which is the mean of the two focal positions can be established and is at the centre of the workpiece, in particular the sheet metal. The laser beam can thereby be focused at the centre of the sheet metal.

Further features and advantages of the invention will be appreciated from the following detailed description of embodiments of the invention, with reference to the Figures of the drawings, showing inventively significant details, and from the claims. The individual features may be implemented individually or together in any combination in variants of the invention.

Embodiments of the invention which are explained in greater detail in the following description are schematically illustrated in the drawings, in which:

DETAILED DESCRIPTION

Figure 1:
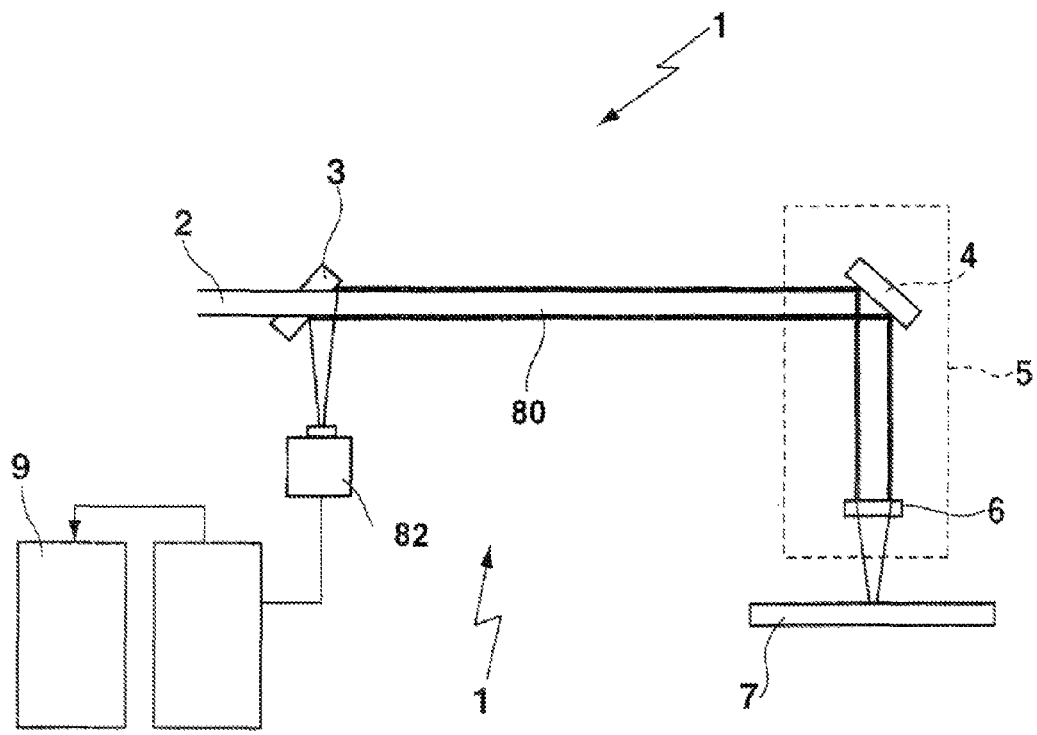
FIG. 1 is a block diagram of part of a laser installation.

Referring to FIG. 1, a laser installation 1, for example, a laser cutting installation, includes a laser beam 2 directed by a mirror 3 onto a redirecting mirror 4 that is arranged in a processing head 5. The laser beam 2 can be used as a test laser beam 2 to determine a focal position of the laser beam 2 that would be suitable for operation of the laser beam 2 during laser processing. And, after the suitable focal position is determined, the laser beam 2 can be used as a processing laser beam 2.

The mirror can be, for example, a focusing scraper mirror. The laser beam 2 is focused using a focusing device 6 and is directed onto a workpiece 7. The focusing device 6 can be, for example, a lens. The workpiece 7 can be, for example, a thin metal sheet. If the laser beam 2 strikes the workpiece 7, radiation 80 can be produced reflected back into the processing head 5 and toward the mirror 3. The radiation 80 is reflected back through the mirrors 4, 3 and is directed by the mirror 3 onto a measuring device 82. The measuring device 82 includes for example, a photodiode having a corresponding electronic unit. The measuring device 82 can include a sensor, a camera, or a perforated mirror.

Figure 3:
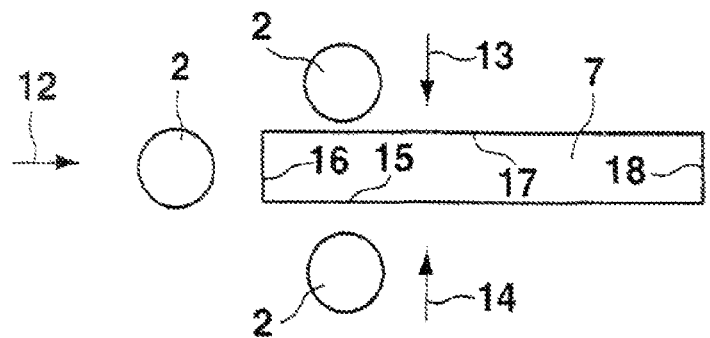
FIG. 3 is a top or side view of a workpiece and test laser beams.
Figure 4:
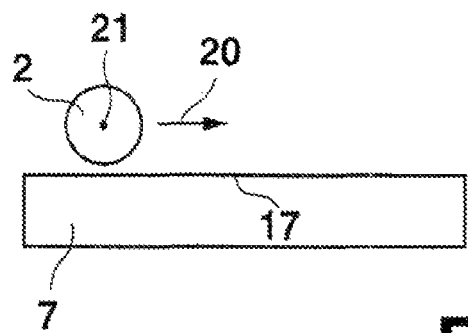
FIG. 4 is a top or side view of a workpiece and a test laser beam.
Figure 5:
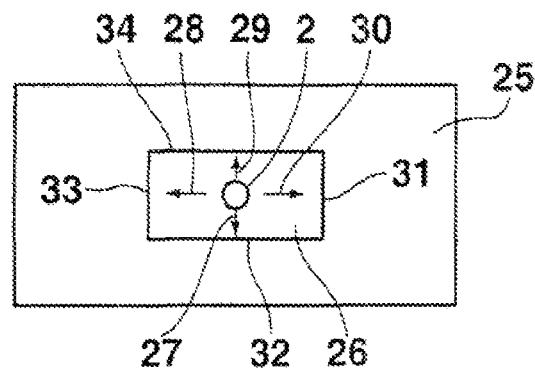
FIG. 5 is a top or side view of a workpiece and a test laser beam.

The information of the measuring device 82 is transmitted to an evaluation and control apparatus 9. The evaluation and control apparatus 9 determines the circumstances under which the laser beam 2, for example, a peripheral region of the laser beam 2, has come into contact with the workpiece 7 (or an edge of the workpiece 7). The apparatus 9 measures the associated focal position, of the laser beam 2 by, for example, measuring the position of the focusing device 6, and/or the height adjustment, that is, the distance of the processing head 5 relative to the workpiece 7, as discussed in detail below. In particular, the laser beam 2 is directed to the workpiece 7 (for example, through a through-hole of the workpiece 7 as shown in FIG. 2, a side of the workpiece 7 as shown in FIGS. 3 and 4, or through an opening of the workpiece 7 as shown in FIG. 5) and the focal position of the laser beam 2 is adjusted until the laser beam 2 contacts the side. The laser beam 2 is directed to the workpiece 7 by directing the beam axis of the laser beam 2 to be perpendicular to the surface to be processed of the workpiece 7 and to be parallel with a side surface of the workpiece 7. The workpiece 7 can be a reference workpiece or a workpiece 7 that is to be processed using the laser beam 2.

The moment at which a peripheral region of the laser beam 2 contacts the side depends on the beam axis and the focal position of the laser beam 2 when it crosses the workpiece 7. The apparatus 9 can use the information about the beam axis in combination with the size of the through-hole or the opening and/or light input to the measuring device 82 to determine the focal position of the laser beam 2 at which the power density is highest when the laser beam 2 is directed to the workpiece 7. In this way, the adjustment of the focal position and the position of the laser beam 2 can be automatically adjusted.

Moreover, if the apparatus 9 determines that the laser beam 2 does not contact the side of the workpiece 7 (for example, the edge of the through-hole), then, this may indicate that a suitable focal position has been found because a minimum distance of the laser beam axis relative to the workpiece 7 may have been found or the laser beam 2 at the plane of the workpiece 7 is narrower than the through-hole. Or, if the apparatus 9 does not determine a suitable focal position after analyzing data, then the apparatus 9 can determine how to adjust the focal position of the laser beam 2 to a more suitable focal position. For example, the apparatus 9 can determine that the focal position should be reduced or increased by a particular amount.

The apparatus 9 can send a signal to cause the laser to switch off after the apparatus 9 detects any radiation due to contact of the laser beam 2 with the workpiece so that the laser beam 2 removes a lower or minimal amount of material from the workpiece. In this way, the laser beam 2 does not cut through or cut appreciably the workpiece during the focal position testing procedure.

Figure 2A:
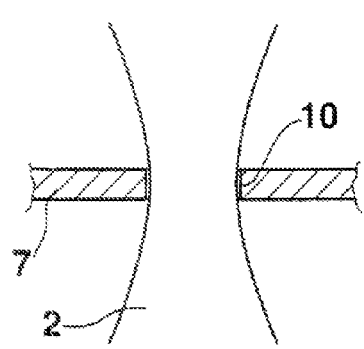
FIG. 2a is a cross-sectional view through a workpiece of the laser installation and a laser beam of FIG. 1.

FIG. 2a is a cross-sectional view of the workpiece 7, in which a reference or test hole such as through-hole 10 has been produced by the laser beam 2. The focal position desired for a laser processing operation is illustrated in FIG. 2a. The focal position is the narrowest location of the laser beam 2, which is illustrated as a waist. As shown in FIG. 2a, the desired location of the focal position is precisely at the level or the plane of the workpiece 7, for example, at the centre of the workpiece 7. That is, the desired location of the focal position is such that a laser beam produces the smallest hole or the narrowest incision gap when the focal position of the laser beam is located at the center of the workpiece 7.

Figure 2B:
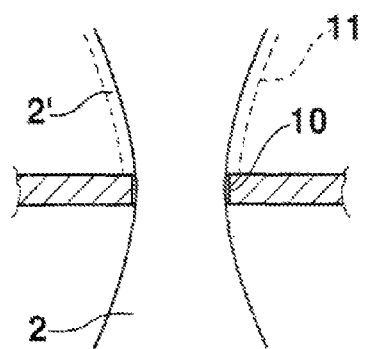
FIG. 2b is a cross-sectional view of the workpiece and the laser beam of FIG. 1.

After the opening 10 has been produced with the laser beam 2 during a first test or a reference hole (for example, as shown in FIG. 2a), the process is repeated at a different focal position, as shown in FIG. 2b. For this different focal position, the beam diameter at the workpiece 7 as shown in FIG. 2b is greater in comparison with the beam diameter at the workpiece 7 as shown in FIG. 2a. Thus, the laser beam 2' reacts with the workpiece 7 because the peripheral region 11 of the laser beam 2' strikes the periphery of the workpiece 7 and enlarges the through-hole 10. This reaction provides information about the direction in which the focal position has to be adjusted in order to determine the focal position of the laser beam that is suitable for workpiece processing. In particular, the process light produced by the reaction of the peripheral region 11 with the side of workpiece 7 is measured by the apparatus 9.

Referring to FIG. 3 the focal position can be determined using another method. FIG. 3 is a top view of a workpiece 7 that is touched by a laser beam 2 from different directions, as indicated by the arrows 12, 13, 14, where the workpiece 7 is defined by sides 15, 16, 17, 18 that are produced, for example, by punching in order to obtain a precisely defined edge. The laser beam 2 is moved towards the sides 15, 16, 17, 18 of the workpiece 7 until a peripheral region of the laser beam 2 comes into contact with the side of the workpiece 7. The laser beam diameter can thereby be determined at an adjusted focal position. This can provide the information as to whether the diameter of the laser beam 2 is small enough to produce cutting widths that are as small as possible. The focal position can be changed until the smallest beam diameter has been found or until the lowest amount of radiation is detected by the apparatus 9.

The laser beam diameter is determined by using the position of the beam axis, which can be obtained from the position of the processing head 5 or the position of the mirror 4 and the focusing device 6. Moreover, the position of the edge of the workpiece 7 can be determined. If the laser beam is directed sideways to the lateral edge or side of the workpiece, then the position of the beam axis is determined when process light is detected for the first time because at that time, the peripheral region of the laser beam has touched the workpiece edge. The distance between the beam axis and the workpiece edge is the radius of the laser beam at the workpiece plane.

FIG. 4 illustrates another method for determining the focal position in which the laser beam 2 is moved along the workpiece 7 in the direction of the arrow 20. During the movement in arrow direction 20, the focal position of the laser beam 2 is varied, that is, changed. A focal position at which the peripheral region of the laser beam 2 is no longer in contact with the side 17 of the workpiece 7 can be found by varying the focal position of the laser beam 2. During this procedure, it is advantageous if the beam diameter of the focused laser beam is known. The laser beam 2 can be arranged during the movement in the arrow direction 20 in such a manner that its beam axis 21 is arranged substantially at a distance from the side 17 of one half of the beam diameter of the focused laser beam 2. The focal position at which no process light or no radiation is produced (as measured at the measuring device 82 after previously detecting process light) is the focal position sought.

FIG. 5 illustrates an alternative way to find the focal position using a workpiece 25 that defines an aperture 26. In the aperture 26 of the workpiece 25, the laser beam 2 is moved in the arrow directions 27, 28, 29, 30 towards sides 31, 32, 33, 34 of the aperture 26. The extent of the laser beam 2 can thereby be established at a given focal position in four directions. The beam diameter of the laser beam 2 therefore can be established.

The thickness of the workpiece 7 or 25 is established in accordance with the requirements on operational accuracy. It is desirable to use workpieces that are as thin as possible because the focal position can be determined more precisely. The workpiece 7 or 25 can be sheet metal, for example, having a thickness of less than or equal to 1 mm. However, the sheet metal thickness is not selected so as to be too thin because the workpiece 7 or 25 can become unstable if the workpiece thickness is too thin, and such instability can impair the measurement accuracy.

The power of the laser beam 2 that is used in the procedure discussed above to determine the focal position can be a different power from the power at which the laser beam 2 is used during laser processing. For example, the power of the laser beam 2 used in the procedure to determine the focal position can be less than the power of the laser beam 2 as it operates during laser processing to reduce damage or material removal from the workpiece 7 or 25 if the laser beam 2 strikes the workpiece 7 or 25.

Figure 6A:
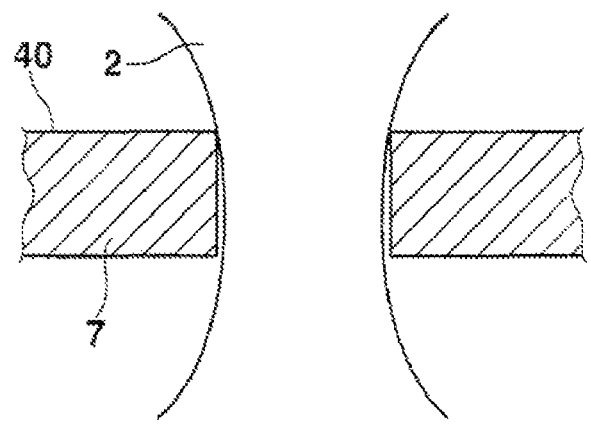
FIGS. 6a-6c are side cross sectional views showing an enlarged section of the workpiece and the test laser beam.
Figure 6B:
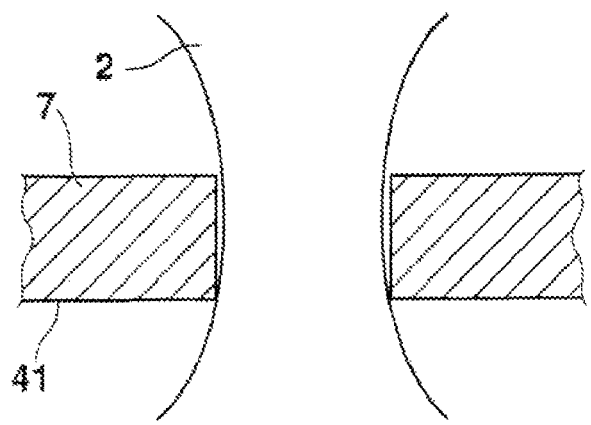
Figure 6C:
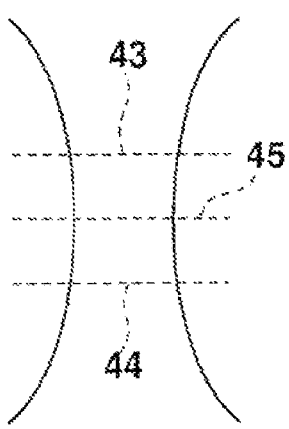

FIGS. 6a-6c illustrate that it is difficult, due to the thickness of the workpiece 7 and the shape of the laser beam 2, to find the location having the highest power density of the laser beam 2. As shown in FIG. 6a, for example, the laser beam 2 or the peripheral region of the laser beam 2 is in contact with an upper side 40 of the workpiece 7. As shown in FIG. 6b, for example, the peripheral region of the laser beam 2 is in contact with an underside 41 of the workpiece 7. The focal positioned at which the laser beam 2 is just in contact with the upper side or underside 40, 41 can be determined with the method described above. However, a focal position that is located between those two focal position is sought, as shown in FIG. 6c. The focal position shown in FIG. 6a is indicated by the dashed line 43 and the focal position shown in FIG. 6b is indicated by the dashed line 44. The focal position that is desired is located between the focal positions 43, 44, and the desired focal position is indicated by the dashed line 45. The focal position 45 can be established by averaging.

Figure 7:
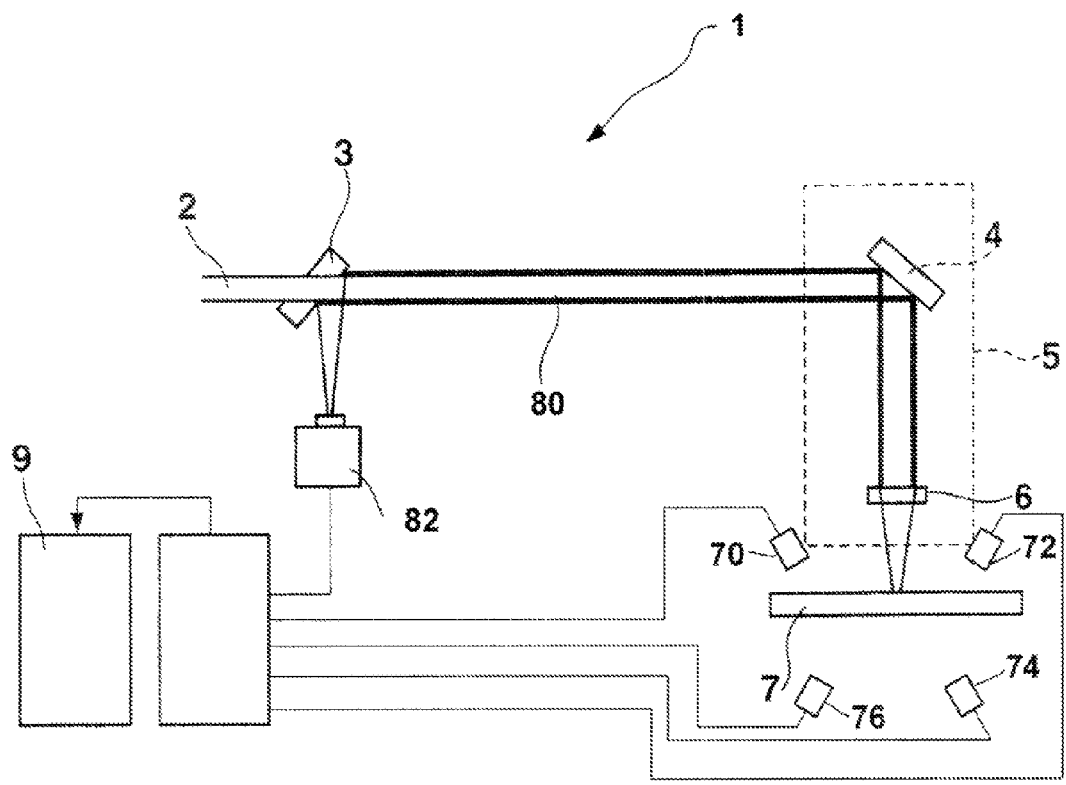
FIG. 7 is a block diagram of part of a laser installation.

Referring to FIG. 7, in other implementations, laser installation can include one or more detectors 70, 72, 74, 76 positioned near the workpiece, for example, between the processing head 5 and the workpiece or below the workpiece, to detect non-reflected process light. The outputs of the detectors 70, 72, 74, 76 are connected to the apparatus 9, which can use the information from the detectors 70, 72, 74, 76 in addition to the information from the measuring device 82.

Figure 8:
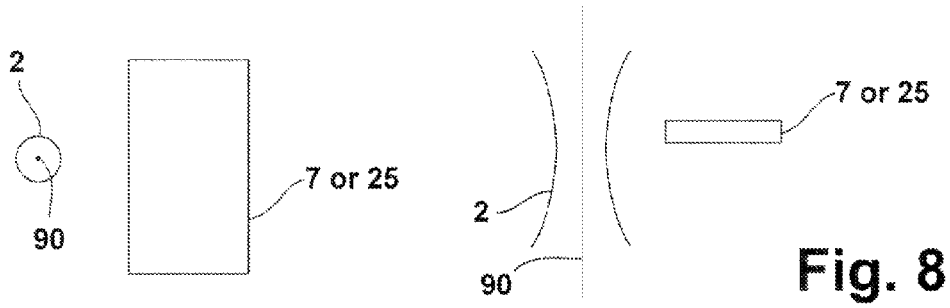
FIGS. 8-11 each show top and side cross-sectional views of exemplary steps in the process to determine a suitable focal position for use in the laser installation of FIG. 1.
Figure 9:
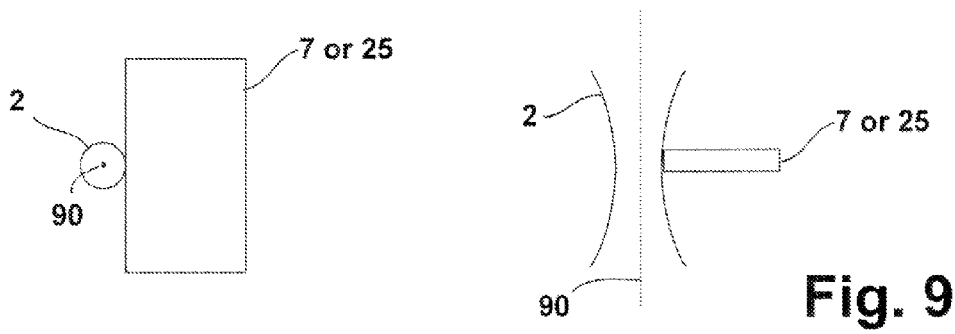
Figure 10:
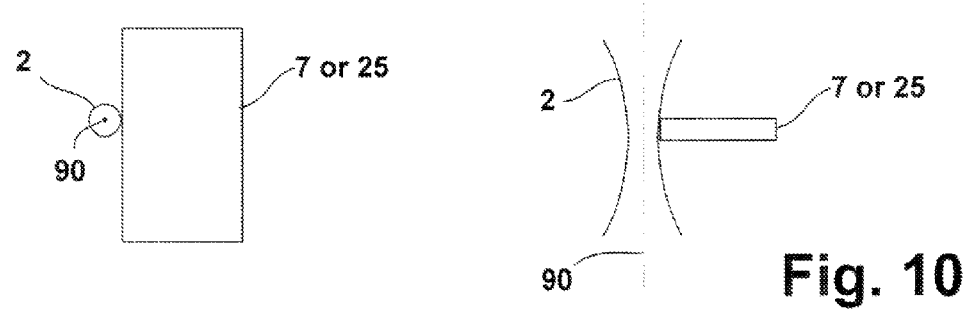
Figure 11:
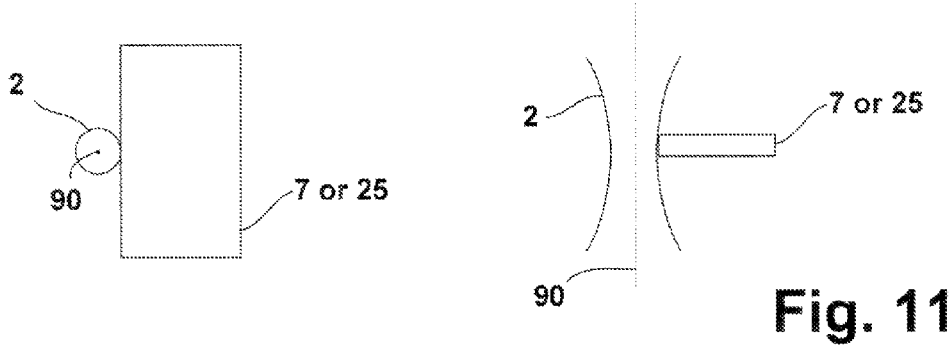

Referring to FIG. 8, in one implementation, the laser beam 2 is directed toward the workpiece 7 or 25 and the apparatus 9 determines that there is no contact between the laser beam 2 and the workpiece 7 or 25. The apparatus 9 determines that there is no contact by analyzing, for example, the output from the measuring device 82 or the detectors 70, 72, 74, 76. Next, as shown in FIG. 9, the laser beam 2 is moved closer to the workpiece 7 or 25 such that a beam axis 90 is moved closer to the workpiece 7 or 25. At this moment, the peripheral region of the laser beam 2 contacts the lateral edge (for example, the side 15, 16, 17, or side 31, 32, 33, or 34) and the apparatus 9 determines that there is contact based on the output from the measuring device 82, or the detectors 70, 72, 74, 76. However, while the laser beam 2 makes contact with the workpiece 7 or 25, it is not evident at this time whether the laser beam 2 focal position is suitable for workpiece processing. Thus, as shown in FIG. 10, the focal position of the laser beam 2 is adjusted such that the beam diameter is reduced at a plane of the workpiece 7 or 25. At this point, it is evident that the focal position of the laser beam 2 in FIG. 10 is better than the focal position of the laser beam 2 in FIG. 9 because, for example, the laser beam 2 is no longer touching the workpiece 7 or 25, but it is not evident that the focal position at FIG. 10 is the optimum. However, even if the focal position isn't optimum, it may be suitable for workpiece processing. As shown in FIG. 11, a further adjustment can be made to the focal position to determine if a more suitable focal position can be obtained. In this case, the beam width of the laser has broadened by adjusting the focal position; therefore, the focal position of FIG. 11 is not as suitable as that of FIG. 10.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method comprising:
    adjusting one or more of a laser beam and a workpiece until a periphery of the laser beam contacts a lateral edge of the workpiece;
    determining, based on at least 1) a laser beam focal position associated with the periphery of the laser beam contacting the workpiece and 2) a laser beam axis position, a suitable workpiece processing focal position of the laser beam, wherein determining the suitable workpiece processing focal position comprises determining the laser beam axis position; and
    adjusting the laser beam to the suitable workpiece processing focal position.

2. The method of claim 1, wherein adjusting the laser beam to the suitable workpiece processing focal position comprises adjusting the laser beam in an iterative manner.

3. The method of claim 1, wherein determining the suitable workpiece processing focal position comprises using information about a beam diameter of the laser beam.

4. The method of claim 1, wherein determining the suitable workpiece processing focal position comprises using information about laser light reflected from the workpiece.

5. The method of claim 1, wherein determining the suitable workpiece processing focal position comprises using information about process light at the workpiece.

6. The method of claim 1, further comprising processing the workpiece with the laser beam adjusted to the suitable workpiece processing focal position.

7. The method of claim 1, further comprising adjusting one or more of the laser beam and the workpiece until the periphery of the laser beam breaks contact with the lateral edge of the workpiece.

8. The method of claim 1, wherein determining the suitable workpiece processing focal position comprises using information about an intensity of radiation reflected from the workpiece.

9. The method of claim 1, further comprising switching off the laser beam if the periphery of the laser beam contacts the lateral edge of the workpiece.

10. The method of claim 1, wherein adjusting one or more of the laser beam and the workpiece comprises adjusting one or more of a beam axis of the laser beam, a location of the workpiece, or the focal position of the laser beam.

11. The method of claim 1, wherein adjusting one or more of the laser beam and the workpiece comprises continuously adjusting the focal position of the laser beam.

12. The method of claim 1, further comprising forming a through hole in the workpiece with the laser beam, wherein the lateral edge of the workpiece is defined by the through hole.

13. The method of claim 1, wherein the lateral edge of the workpiece is defined by an opening in the workpiece.

14. The method of claim 1, wherein the lateral edge of the workpiece is defined by an outer lateral edge of the workpiece.

15. The method of claim 1, wherein determining the suitable workpiece processing focal position of the laser beam further comprises using information about a focal position of the laser beam when the laser beam is not in contact with the workpiece.

16. The method of claim 1, wherein determining the suitable workpiece processing focal position of the laser beam comprises:
    using information about a focal position of the laser beam when the laser beam is in contact with a top corner of the lateral edge of the workpiece; and
    using information about a focal position of the laser beam when the laser beam is in contact with a lower corner of the lateral edge of the workpiece.

17. A method comprising sequentially:
    directing a laser beam toward a plane of a workpiece;
    adjusting a focal position of the laser beam, wherein adjusting the focal position comprises varying the focal position along a direction orthogonal to the plane of the workpiece;
    ascertaining, for at least two different focal positions, whether at least a peripheral region of the laser beam contacts a periphery of an aperture in the workpiece or contacts a lateral edge of the workpiece, wherein the lateral edge is nonparallel to the plane of the workpiece;

determining, based on the at least two different focal positions, at least one parameter associated with one or more of the laser beam and the workpiece, wherein determining the at least one parameter comprises determining a beam axis position of the laser beam; and determining a suitable focal position of the laser beam based on the parameter.

18. The method of claim 17, further comprising moving one or more of the laser beam and the workpiece relative to each other while varying the focal position.

19. The method of claim 17, wherein determining the at least one parameter comprises measuring at least one variable that describes the circumstances under which at least the peripheral region of the laser beam contacts the workpiece.

20. The method of claim 17, wherein determining the at least one parameter further comprises detecting radiation or process light emitted at the workpiece.

21. The method of claim 17, wherein determining the at least one parameter further comprises detecting plasma radiation.

22. The method of claim 17, wherein determining the at least one parameter comprises determining whether the peripheral region of the laser beam comes into contact with an upper side or an underside of the workpiece.

23. The method of claim 17, wherein determining the suitable focal position comprises ascertaining the circumstances under which the peripheral region of the laser beam contacts the workpiece.

24. The method of claim 17, wherein determining the suitable focal position comprises ascertaining the circumstances under which the peripheral region of the laser beam no longer contacts the workpiece after determining a focal position at which the peripheral region of the laser beam contacts the workpiece.

25. The method of claim 17, further comprising moving one or more of the workpiece and the laser beam relative to each other until the peripheral region of the laser beam contacts the workpiece.

26. The method of claim 17, further comprising switching off the laser beam if it is ascertained that the peripheral region of the laser beam is contacting the workpiece.

27. The method of claim 17, further comprising:
producing, at a first focal position, a through-hole in the workpiece, and
subsequently, at a second focal position, directing the laser beam at the through-hole.

28. The method of claim 17, further comprising establishing the suitable focal position in an iterative manner.

29. The method of claim 17, further comprising varying the focal position continuously or quasi-continuously.

* * * * *